Aug. 7, 1934.                A. KOHUT                 1,969,309
                    COMBINED LIGHT AND REED HOOK
                    Filed Jan. 31, 1934      3 Sheets-Sheet 1
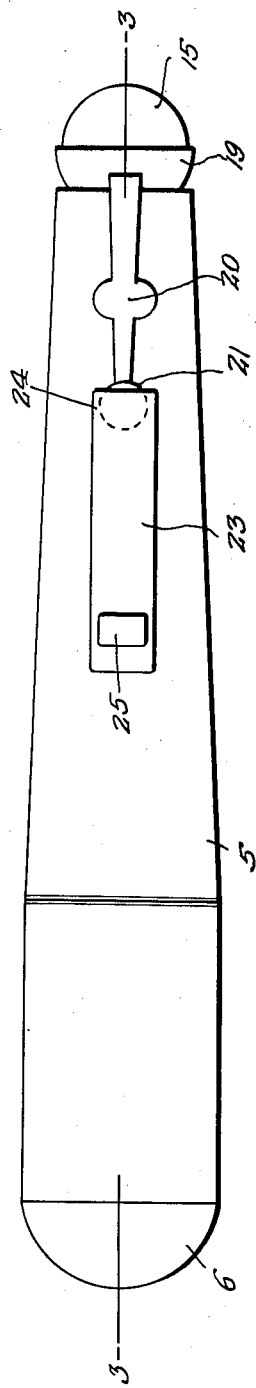
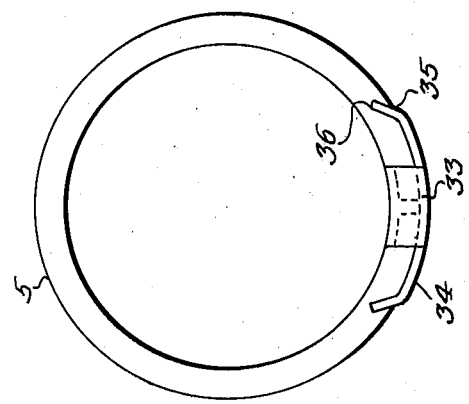
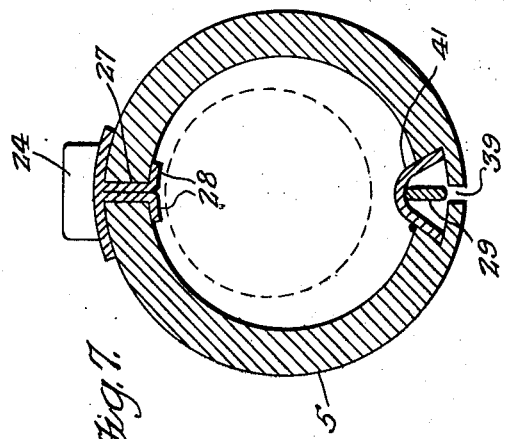
Inventor
*Andrew Kohut,*
By *Clarence A. O'Brien*
                                    Attorney Aug. 7, 1934.  A. KOHUT  1,969,309
COMBINED LIGHT AND REED HOOK
Filed Jan. 31, 1934   3 Sheets-Sheet 2
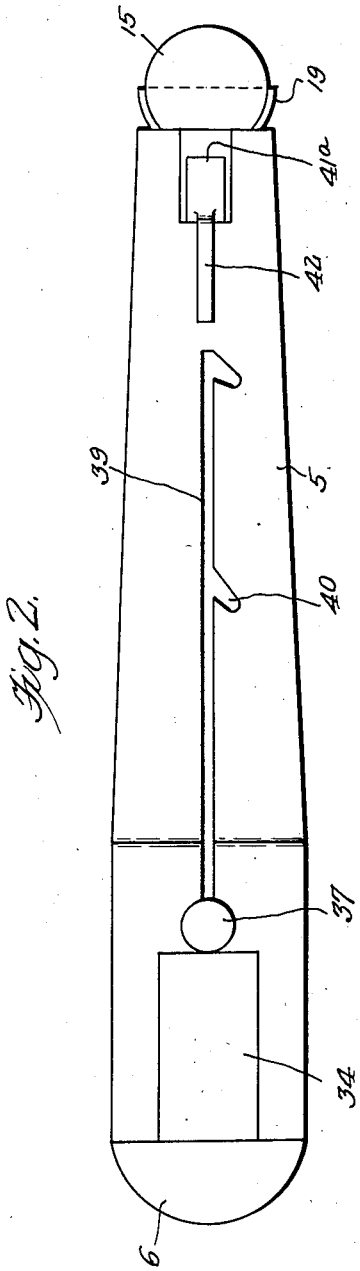
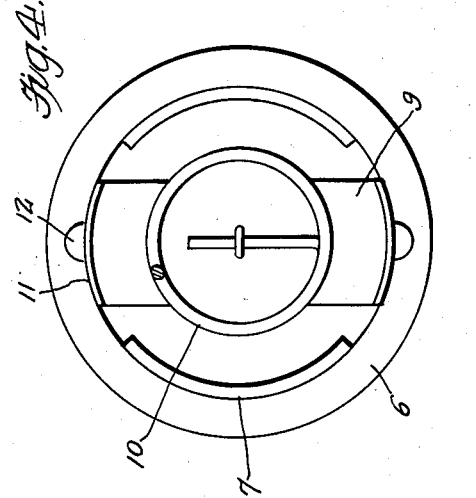
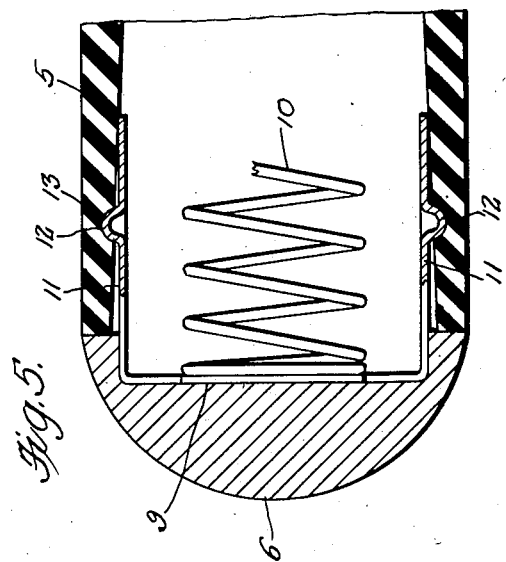
Inventor
Andrew Kohut
By Clarence A. O'Brien
Attorney Aug. 7, 1934.   A. KOHUT   1,969,309
COMBINED LIGHT AND REED HOOK
Filed Jan. 31, 1934   3 Sheets-Sheet 3
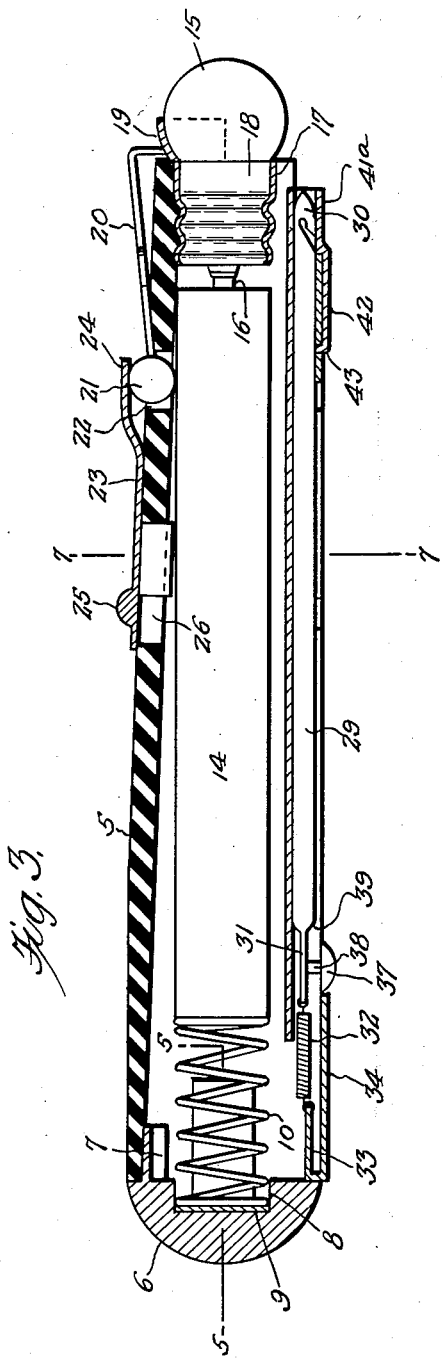
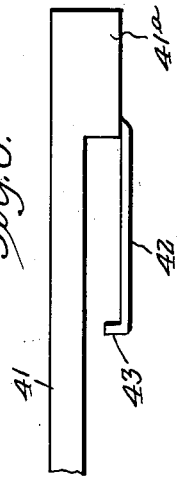
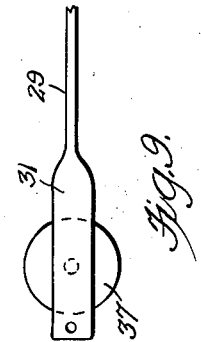
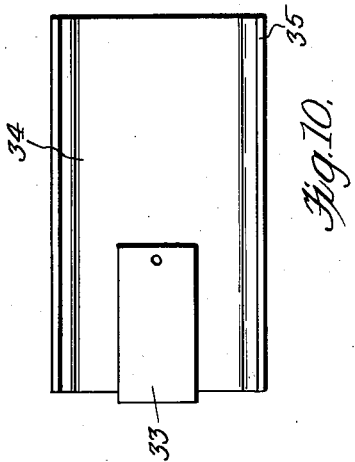
Inventor
Andrew Kohut,
By *Clarence A. O'Brien*
Attorney Patented Aug. 7, 1934

1,969,309

UNITED STATES PATENT OFFICE 1,969,309

COMBINED LIGHT AND REED HOOK

Andrew Kohut, Pawtucket, R. I.

Application January 31, 1934, Serial No. 709,211

1 Claim. (Cl. 240—6.4)

This invention appertains to new and useful improvements in the general art of illumination, and more specifically to a combined structure involving a reed hook and illuminating means therefor.

The principal object of the present invention is to provide a weaver's tool in the form of an illuminated reed hook which will greatly assist loom tenders in their work.

During the course of the following specification and claims, other important objects and advantages of the invention will become apparent to the reader.

In the drawings:—

Figure 1 represents a side elevational view of the novel instrument.

Figure 2 represents another side elevational view of the instrument, looking at the opposite side from that shown in Figure 1.

Figure 3 represents a longitudinal sectional view taken substantially on line 3—3 of Figure 1.

Figure 4 represents an end elevational view of the instrument, with the cap removed.

Figure 5 represents a sectional view taken substantially on line 5—5 of Figure 3.

Figure 6 represents an end elevational view of the barrel, showing the hook attaching plate.

Figure 7 represents a sectional view taken substantially on line 7—7 of Figure 3.

Figure 8 represents a side elevational view of the hook guide.

Figure 9 represents a fragmentary side elevational view of the button end of the reed hook.

Figure 10 represents a side elevational view showing the inside of the reed hook attaching plate.

Referring to the drawings wherein like numerals designate like parts, it can be seen that numeral 5 represents a longitudinally tapering metallic shell provided at its enlarged and butt end with a cap 6 having an extension 7 for snug disposition into the shell. The cap is of metal and has a seat 8 therein in which the plate 9 is located and against which the elongated compressible coiled spring 10 engages when the cap is properly engaged with the shell and this engagement is obtained by employment of a pair of spring arms 11—11 extending from the plate 9 and each provided with a boss 12 engageable into a corresponding recess 13 in the inner surface of the shell 5.

A battery of the dry-cell type and denoted by numeral 14, is disposed in the shell and against this engages the opposite end of the coiled spring 10, as in the manner substantially shown in Figure 3. In this manner, the zinc side of the battery is engaged with the spring 10, while the carbon pole is engaged with the central contact of the bulb 15 by way of the battery contact 16. Numeral 17 represents a threaded socket in the shell 5 for receiving the metallic jacket portion 18 of the bulb 15.

This socket 17 has an extending portion 19 projecting beyond the forward end of the shell 5 and to this is attached the usual pocket clip 20 which is of metal and which has its ball end 21 opposite the opening 22 in the shell 5.

Numeral 23 represents a slider having an offset free end portion 24 capable of riding over the ball 21 and forcing the same into the opening 22 so that a portion of the clip 20 will engage against the metallic shell 5.

This slider 23 has the finger engaging boss 25 at its opposite end and extending laterally from this slider 23 and through the slot 26 in the shell 5 are the flanges 27—27, each of which is provided with a laterally disposed portion 28 at the inside of the shell to engage against the inside of the shell so that the slider cannot pull apart from the said shell.

Obviously, when the slider 23 is moved into the position shown in Figure 3, the ball 21 will be forced into the opening 22 and while this in itself does not close the circuit, it gives freedom to the clip 20 so that the clip can engage the side of the shell 5 and complete the electrical circuits from the battery by way of the spring 10, shell 5, clip 20, socket 17, jacket 18, the filament of the lamp 15, back to the battery.

The reed hook feature of the invention involves an elongated rod 29 having the usual reed hook formation 30 at one end, while its opposite end is twisted at right angles, as at 31, and provided with an eye for receiving one end of the spring 32.

The opposite end of the spring 32 (at the butt end of the instrument) is attached to the backwardly disposed lug 33 on the plate 34. This plate 34 is of arcuate shape transversely and its longitudinal edge portions are provided with flanges 35 bearing into the parallel slots 36 in the outer side of the shell 5.

The right angular portion 31 of the rod 29 is provided with a button 37 which rides against the outside of the shell, while its connecting shank 38 rides in the slot 39 extending longitudinally of the shell 5. At predetermined points along the slot 39, the shell 5 is provided with notches 40 into which the shank 38 can engage to retain the hook 30 in predetermined projected position.

At the forward end of the shell 5 is located retaining means for an elongated guide element 41. This guide element is of substantially V-shape in cross section, as shown in Figure 7, for the most part of its extent, while its forward end is of tubular construction, as at 41ᵃ (see Figure 8), and through this tubular end the hook 30 is rideable to a projected position.

This tubular portion 41ᵃ is provided with a backwardly extending arm 42 provided with a lug 43. The arm is preferably of spring material so that the lug 43 can snap into a recess in the side of the shell 5 so as to retain the guide 41 in the proper position within the shell.

Obviously, when the button shank 38 is released from the notch 40 in which the same is disposed for retaining the hook in projected position, the hook will readily snap back into the guide 41 as a result of the tension of the spring 32.

Obviously, when the hook is in projected position, and the slider 23 has been projected forwardly to bind the clip 20 against the shell 5, the area of the loom within which the tender is to work will be thoroughly illuminated so that his work can be performed quickly and efficiently.

While the foregoing specification sets forth the invention in specific terms, it is to be understood that numerous changes in the shape, size and materials may be resorted to without departing from the spirit and scope of the invention as claimed hereinafter.

Having described the invention, what is claimed as new is:—

A light structure comprising a di-electric shell, a dry cell battery disposed within the shell and provided with a zinc side, a cap at one end of the shell, a spring interposed between one end of the battery and the cap, a slider on the outside of the shell, said shell being provided with an opening, a pocket clip of current conductive material, a bulb, a metallic bulb socket to which one end of the clip is secured, said battery being engageable with the central contact of the bulb, said slider being operative to force one end of the clip into the said opening so that a portion of the clip will engage the said zinc side of the battery to complete a circuit for energizing the bulb.

ANDREW KOHUT.